US007314021B2

(12) United States Patent
Moninski

(10) Patent No.: US 7,314,021 B2
(45) Date of Patent: Jan. 1, 2008

(54) OPERATION INDICATOR

(75) Inventor: Joseph P. Moninski, Arlington Heights, IL (US)

(73) Assignee: S & C Electric Co., Chicago, IL (US)

( * ) Notice: Subject to any disclaimer, the term of this patent is extended or adjusted under 35 U.S.C. 154(b) by 4 days.

(21) Appl. No.: 11/324,959

(22) Filed: Jan. 3, 2006

(65) Prior Publication Data

US 2006/0219154 A1 Oct. 5, 2006

Related U.S. Application Data

(60) Provisional application No. 60/645,414, filed on Jan. 21, 2005.

(51) Int. Cl.
*G01D 13/08* (2006.01)
*G01D 5/00* (2006.01)
*F16K 37/00* (2006.01)

(52) U.S. Cl. ....................... 116/281; 116/284; 116/277; 116/299; 137/553

(58) Field of Classification Search ................ 116/281, 116/200, 201, 230, 231, 233, 282, 283, 284, 116/285, 299, 300, 301, 305, 316, 317, 277, 116/DIG. 21; 137/556, 553; 40/473
See application file for complete search history.

(56) References Cited

U.S. PATENT DOCUMENTS 2,379,517 A * 7/1945 Hadden ...................... 116/277
3,148,701 A * 9/1964 Bagwell ..................... 137/556
3,780,693 A * 12/1973 Parr ........................... 116/270
3,804,056 A * 4/1974 Lee et al. ................... 116/277
4,448,148 A * 5/1984 Gain, Jr. ..................... 116/277
4,494,565 A * 1/1985 Sinclair et al. ............. 137/555
4,494,566 A * 1/1985 Sinclair et al. ............. 137/556
5,178,187 A * 1/1993 Raymond et al. ........... 137/556
5,223,822 A * 6/1993 Stommes et al. ........... 137/551
5,469,805 A * 11/1995 Gibbs ......................... 116/284
5,535,698 A * 7/1996 Trevisan ..................... 116/277
5,957,158 A * 9/1999 Volz et al. .................. 137/556
6,820,647 B1 * 11/2004 Grecco et al. ............. 137/552

* cited by examiner

*Primary Examiner*—Diego Gutierrez
*Assistant Examiner*—Amy R. Cohen
(74) *Attorney, Agent, or Firm*—James V. Lapacek

(57) ABSTRACT

An operation indicator is provided to indicate the open/closed status of device, e.g. a circuit interrupter operable between open and closed operating positions. The operation indicator includes two indicator members having cooperating interleaved or interlaced construction such that a relative small operating stroke of the operable device results in relatively larger open and closed symbol and indicating surfaces.

1 Claim, 6 Drawing Sheets

OPERATION INDICATOR

This application claims the benefit of U.S. Provisional Application No. 60/645,414 filed on Jan. 21, 2005.

BACKGROUND OF THE INVENTION

1. Field of the Invention

The present invention relates generally to the field of indicators and, more particularly, to an operation indicator in the electrical power field to indicate the open/closed status of an interrupter, the indicator including an interleaved or interlaced construction between two indicator members such that a relative small operating stroke of the interrupter results in relatively larger open and closed symbol and indicating surfaces.

2. Description of the Related Art

Various indicators are known for visibly displaying the operational status of a device, e.g. a circuit interrupter.

While the prior art arrangements may be generally useful, for desirable visibility from the ground, they often require a relatively large operating stroke to render them visible, i.e. the larger the display surface the larger the required operating stroke.

SUMMARY OF THE INVENTION

Accordingly, it is a principal object of the present invention to provide an operation indicator to indicate the open/closed status of an interrupter, the indicator including interleaved or interlaced construction between two indicator members such that a relative small operating stroke of the interrupter results in relatively larger open and closed symbol and indicating surfaces.

It is another object of the present invention to provide an operation indicator for a circuit interrupter that provides a large indicating surface that is changeable from closed to open status with a small operating stroke of the interrupter.

These and other objects of the present invention are efficiently achieved by an operation indicator for a device operable from closed to open status. The operation indicator includes two indicator members having cooperating interleaved or interlaced construction such that a relative small operating stroke of the operable device results in relatively larger open and closed symbol and indicating surfaces.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
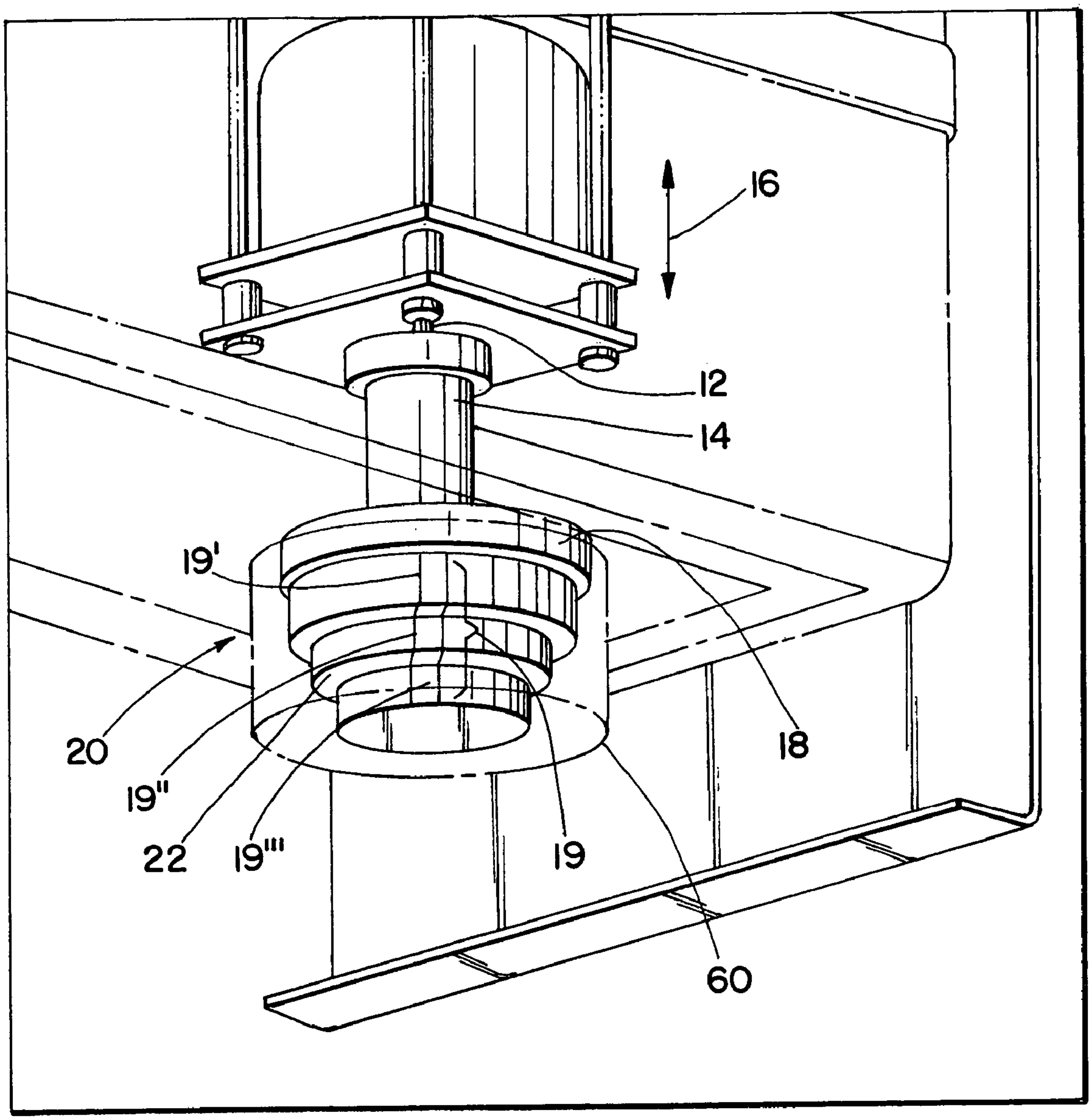
FIG. 1 is a perspective view of an operation indicator in accordance with the present invention shown in a closed position and illustrated in conjunction with an illustrative device to which the operation indicator responds.

Referring now to FIG. 1, an operational indictor 20 of the present invention is provided for use with an electrical device such as a switch or circuit-interrupting device, e.g. an illustrative interrupter 10 as shown in FIG. 1. In this implementation, the operation indicator 20 provides the open and closed status of the interrupter 10, e.g. so as to clearly advise operating personnel of the status of the interrupter switch 10 from distances of ten or fifteen feet or more as is useful when the interrupter 10 is mounted overhead and close approach is neither desirable due to high voltage nor practical since this requires a bucket truck or the like. In a preferred arrangement, the operation indicator 20 displays a first color and symbol such as the color red and a closed symbol such as a straight line when the interrupter is closed and a second color and symbol such as the color green and an open symbol such as the letter "O" when the interrupter is open. For example, as shown in FIG. 1, the operation indicator 20 corresponds to the interrupter 10 being closed and displaying the closed symbol at 19 comprised of three segments 19', 19", 19'".

The operation indicator 20 is operated by the interrupter 10, e.g. via movement of an actuator output 12 of the interrupter 10 to which is connected an actuator member 14 of the operation indicator 20, e.g. the actuator output 12 being translated along the path 16 with the upward direction in FIG. 1 corresponding to closing operation of the interrupter 10 and the downward direction in FIG. 1 corresponding to opening operation of the interrupter 10. Thus, in FIG. 1, the operation indicator 20 is shown with the actuator output 12 of the interrupter 10 in the upward, closed position.

Figure 2:
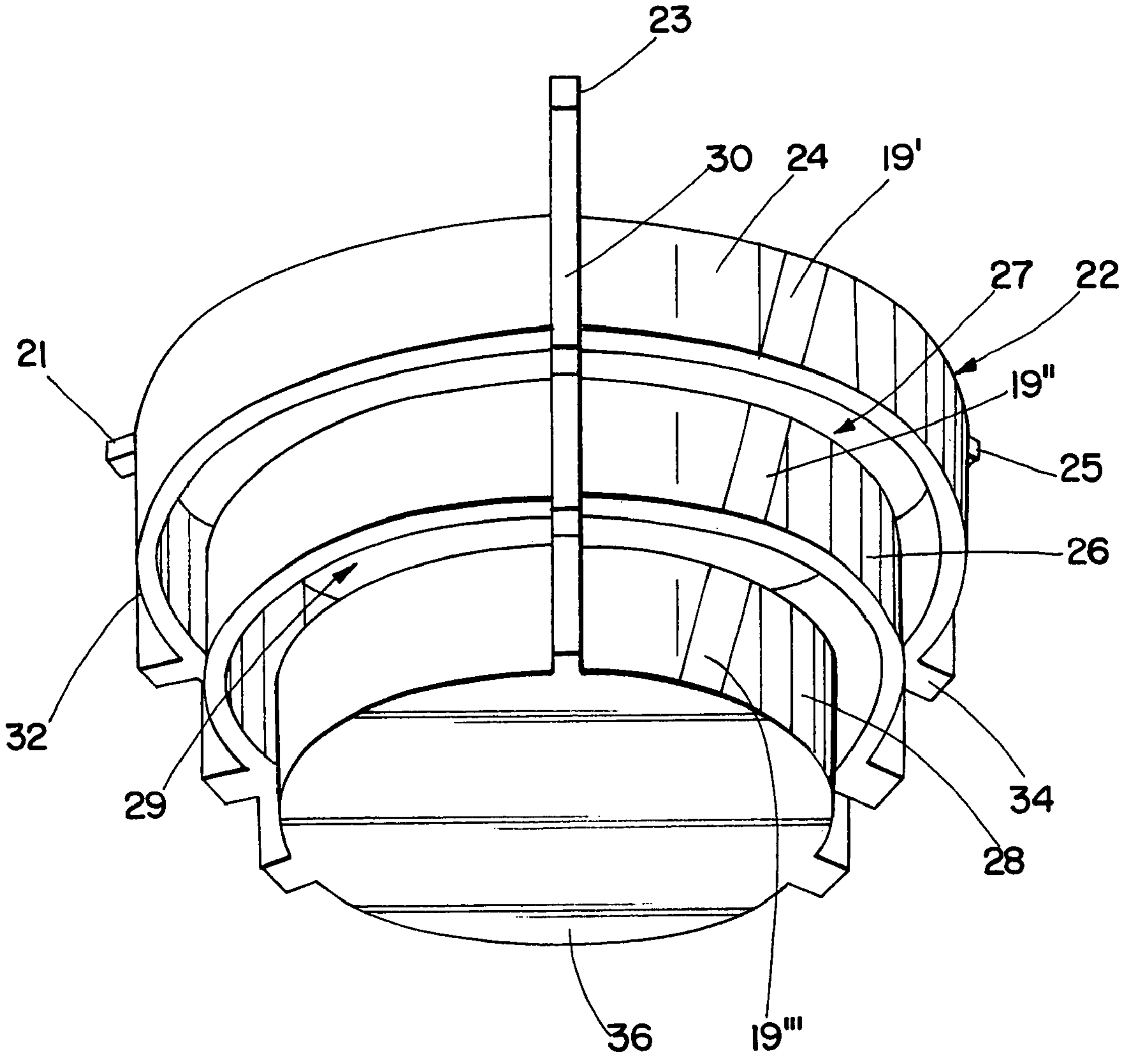
FIGS. 2 and 3 are perspective views of a first member of the operation indicator of FIG. 1.
Figure 3:
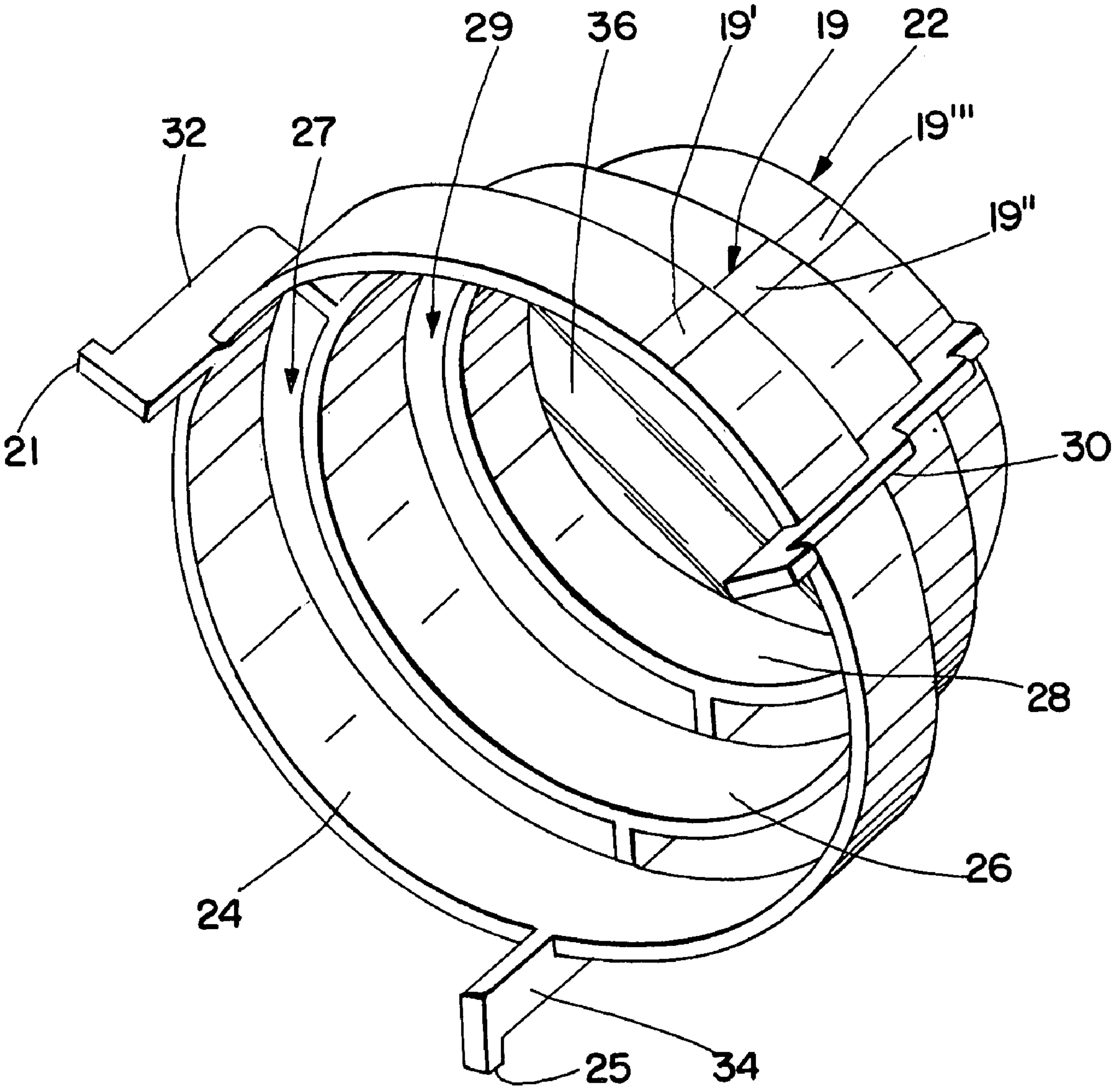

With additional reference now to FIGS. 2 and 3, the operation indicator 20 includes a first indicator 22 that is stationary and functions as a closed position display, e.g. having mounting tabs 21, 23, 25 for attachment to a mounting member 18 for the interrupter 10. In a preferred embodiment, the first indicator 22 is fabricated to define a plurality of concentric rings, e.g. three rings 24, 26, 28 spaced axially along the direction of the path 16 and separated by ribs 30, 32, 34, the rings 24, 26, 28 being of predetermined decreasing diameter along the direction facing away from the actuator member 14 so as to define circumferential spaces or gaps 27, 29 between adjacent rings 24, 26 and 26, 28 respectively. The first indicator 22 also includes a base 36 that closes the bottom ring 28, e.g. to permit observation from below the operation indicator 20.

Figure 4:
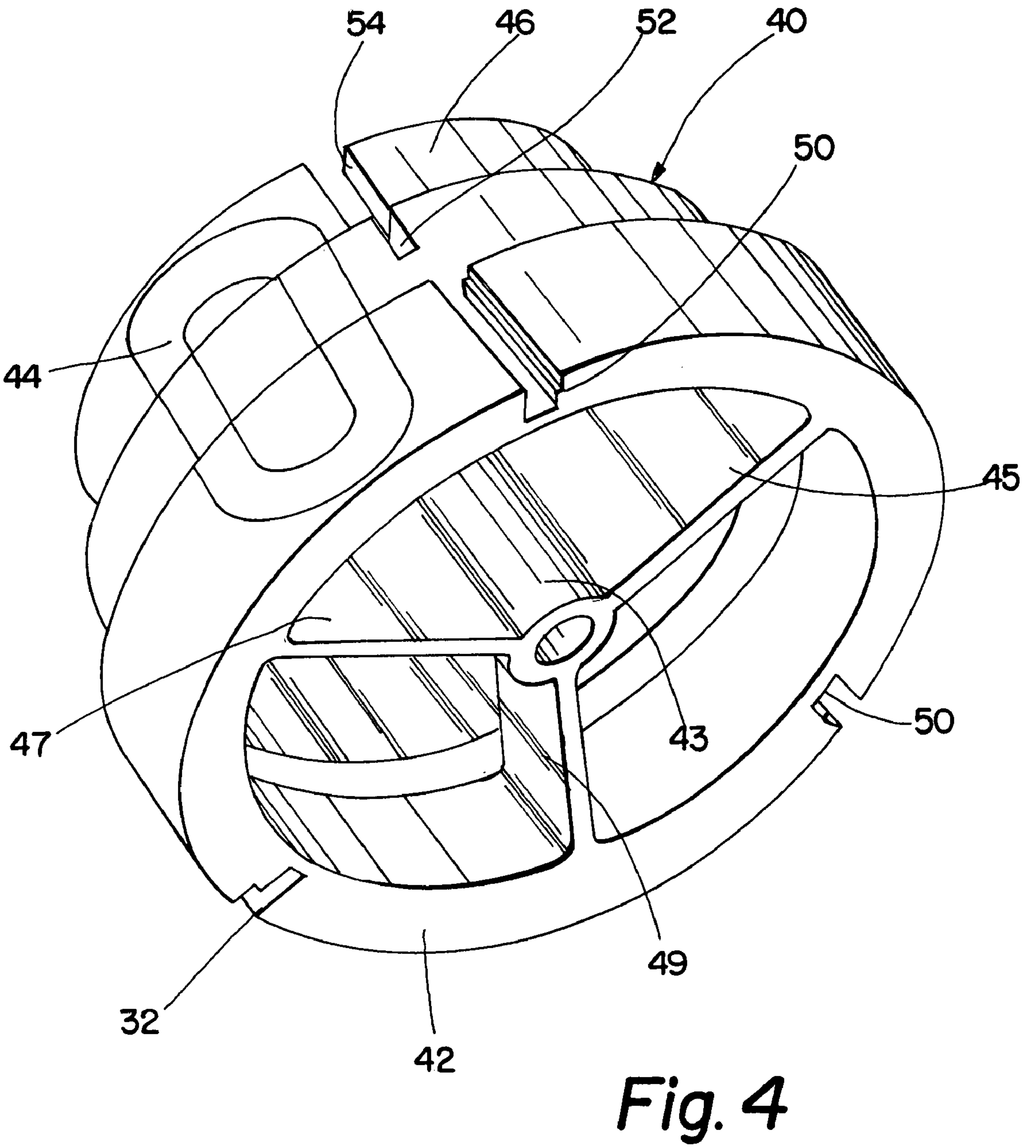
FIGS. 4 and 5 are perspective views of a second member of the operation indicator of FIG. 1, FIG. 5 also illustrating an attached actuator member.
Figure 5:
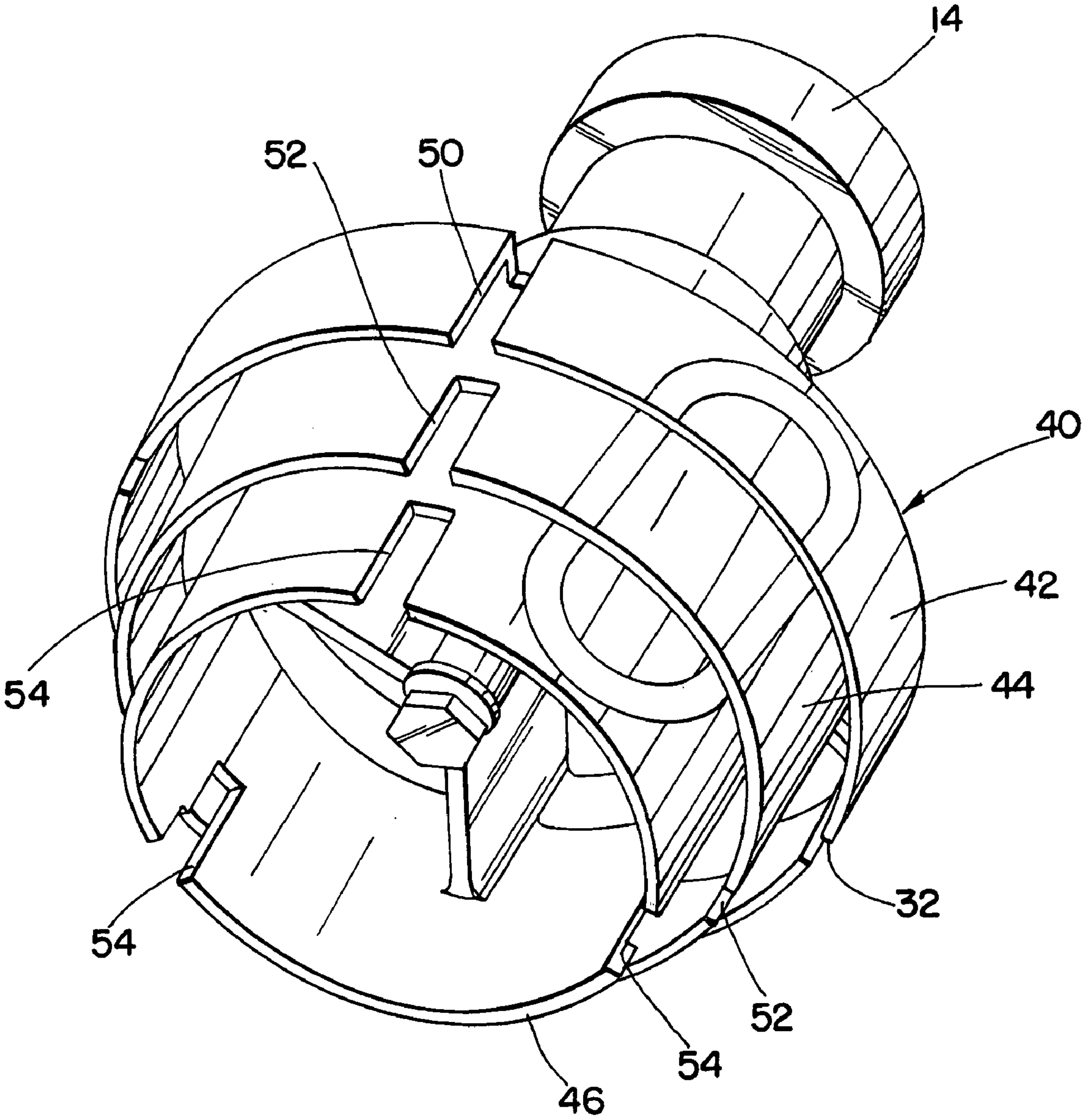

With additional reference now to FIGS. 4 and 5, the operation indicator 20 also includes a second indicator 40 for the open position display, shown in an upward position in FIG. 1 and almost totally obscured by and having lower portions positioned within the first indicator 22. The second indicator 40 is attached to and driven by the actuator member 14. The second indicator 40 is also fabricated to define a plurality of concentric rings, e.g. three rings 42, 44, 46 spaced axially along the direction of the path 16, the rings 42, 44, 46 being of predetermined decreasing diameter along the direction facing away from the actuator member 14 and being defined about a central web structure having a central tube 43 and web arms 45, 47, 49. The uppermost ring 42 is arranged to be above the mounting member 18 in this closed position. Each of the rings 42, 44, 46 also include three circumferentially spaced gaps 50, 52, 54 respectively, the gaps 50, 52, 54 being dimensioned and arranged to align with the ribs 30, 32, 34 of the first indicator 22 so as to permit the rings 42, 44, 46 of the second indicator 40 when positioned inside the first indicator 22 to move outside and over the respective rings 24, 26, 28 of the first indicator 22.

Thus, when the interrupter 10 is operated to the open position, the second indicator 40 is driven downward in FIG. 1 via movement of the actuator member 14 so as to extend the rings 42, 44, 46 over the respective interlacing rings 24, 26, 28 so as to essentially totally obscure the first indicator 22, i.e. cover all visible indicating surfaces of the inner indicator 22. Accordingly, the open symbol "O" is now visible. Thus, it can be seen that with a relatively short operating stroke or movement of the actuator member 14, a relatively larger display surface or symbol is achieved for ease of observation by ground observers of an overhead installation. For a measure of protection from the environment, the operation indicator 20 includes transparent cover 60.

Figure 6:
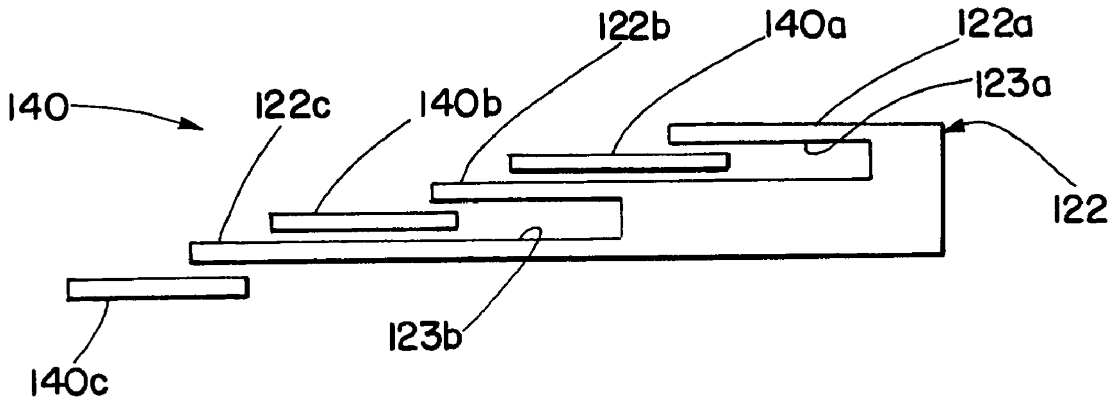
FIG. 6 is an elevational view of an operation indicator in accordance with a second embodiment of the present invention.

In accordance with a second embodiment of the present invention and with reference now to FIG. 6, a fixed stationary indicator 122 including spaced-apart indicating surfaces 122*a,b,c* functions as a closed position indicator. An open position display 140 is provided via movement of members 140*a,b,c* that are arranged to interleave or interlace with the indicating surfaces 122*a,b,c* via slots 123*a,b* formed between the indicating surfaces 122*a,b,c*. As shown in FIG. 6, the open indicating surface 140*c* is hidden below the closed indicator surface 122*c* in the withdrawn, closed position.

Figure 7:
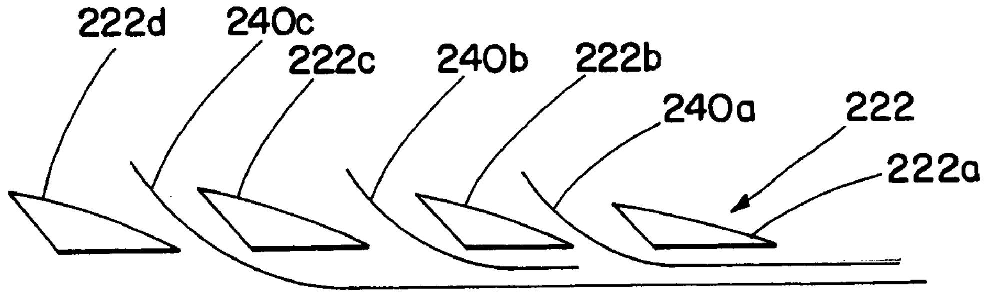
FIG. 7 is an elevational view of an operation indicator in accordance with a third embodiment of the present invention.

In accordance with a third embodiment of the present invention and with reference now to FIG. 7, a fixed stationary indicator 222 including indicating surfaces 222*a,b,c,d* functions as a closed position indicator. An open position display is provided via the movement of flexible indicating surfaces 240*a,b,c* which are fabricated so as to be extend between and be movable with respect to the indicating surfaces 222*a,b,c* so as to cover the indicating surfaces displays 222*b,c,d* in an extended position as shown in FIG. 7 and form an open display via the surfaces 240*a,b,c*.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

The invention claimed is:

1. An operation indicator comprising:

a first indicator; and a second indicator disposed about said first indicator and including a plurality of portions for cooperation and interfitting with portions of the first indicator, said second indicator being movable from a first position to a second position so as to extend over predetermined portions of the first indicator whereby the first indicator indicates a first operable state with the second indicator in the first position and the second indicator indicates a second operable state with the second indicator in the second position, said first indicator including a plurality of concentric rings axially spaced and of decreasing diameter in a first direction, said second indicator including a plurality of concentric rings axially spaced and of decreasing diameter in the first direction, such that said cooperating interfitting portions of said first and second indicators permit the second indicator to interfit with and move over the rings of the first indicator.

* * * * *